United States Patent
Paduvalli

(10) Patent No.: US 9,899,921 B1
(45) Date of Patent: Feb. 20, 2018

(54) ADAPTIVE SLOPE COMPENSATION FOR CURRENT MODE SWITCHING POWER SUPPLY

(71) Applicant: Linear Technology Corporation, Milpitas, CA (US)

(72) Inventor: Vikas V. Paduvalli, San Jose, CA (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 0 days.

(21) Appl. No.: 15/422,373

(22) Filed: Feb. 1, 2017

(51) Int. Cl.
*H02J 3/12* (2006.01)
*G05F 1/00* (2006.01)
*H02M 3/158* (2006.01)
*H02M 1/08* (2006.01)
*H02M 3/157* (2006.01)
*H02M 1/00* (2006.01)

(52) U.S. Cl.
CPC ............ *H02M 3/158* (2013.01); *H02M 1/08* (2013.01); *H02M 3/157* (2013.01); *H02M 2001/0009* (2013.01)

(58) Field of Classification Search
CPC ......... G05F 1/575; G05F 3/242; H02M 3/157
USPC ......... 323/242, 243, 274–277, 283–285, 288
See application file for complete search history.

(56) References Cited

U.S. PATENT DOCUMENTS

| 7,560,917 | B2* | 7/2009 | Ho | H02M 3/158 323/285 |
| 8,754,622 | B2* | 6/2014 | Dobkin | H02M 3/156 323/282 |
| 8,994,352 | B2* | 3/2015 | Zhu | H02M 3/156 323/284 |
| 2010/0320974 | A1* | 12/2010 | Manlove | H02M 3/157 323/222 |
| 2014/0176107 | A1* | 6/2014 | Yu | H02M 3/156 323/285 |

\* cited by examiner

*Primary Examiner* — Gary Nash
(74) *Attorney, Agent, or Firm* — Patent Law Group LLP; Brian D. Ogonowsky

(57) ABSTRACT

A current mode switching converter includes a transistor switch, an inductor configured to conduct a ramping inductor current as the transistor switch is turned on and off at a particular duty cycle, and an inductor current sensor generating a current sense signal. The current sense signal has an up-slope portion and a down-slope portion. A separate ramp generator generates a ramp voltage for each switching cycle. A slope compensation circuit compensates the ramp voltage, depending on the duty cycle and other factors, to create a compensated ramp voltage. The compensated ramp voltage is then summed with the current sense signal to create a compensated current sense signal for a comparator. The slope compensation circuit forces the compensated current sense signal to have an up-slope greater than an absolute value of its down-slope at least for duty cycles greater than 50% to rapidly dampen perturbations in the duty cycle.

20 Claims, 11 Drawing Sheets

Visense

Visense+
compensation
from voltage
source B1

Slopes applied
to S/H circuits
(Vdifferential)

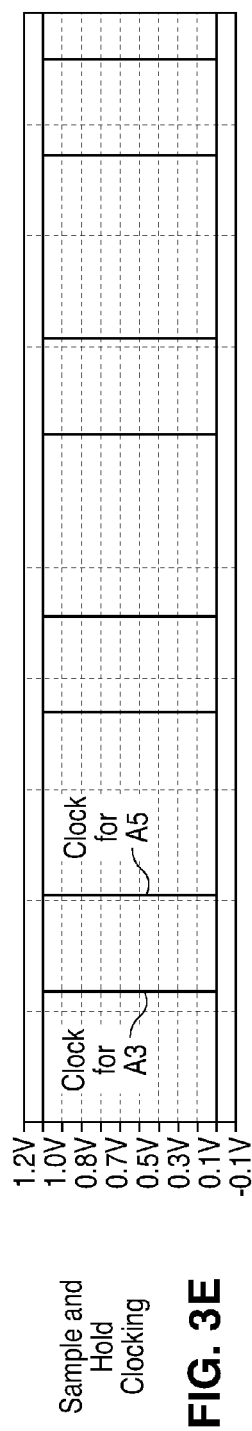
FIG. 3E Sample and Hold Clocking
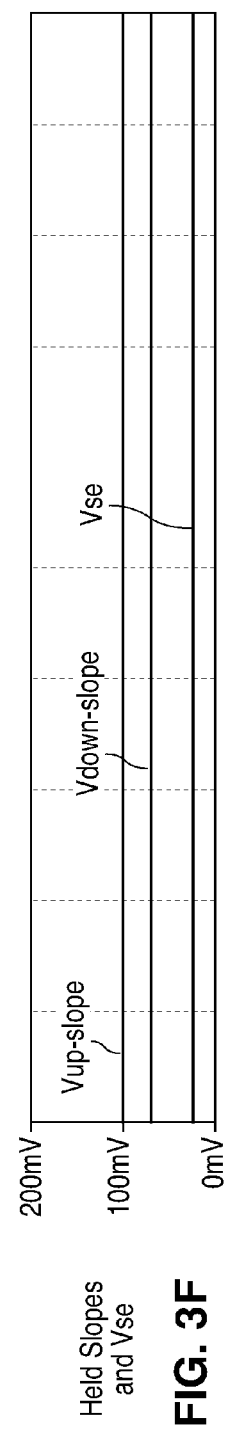
FIG. 3F Held Slopes and Vse
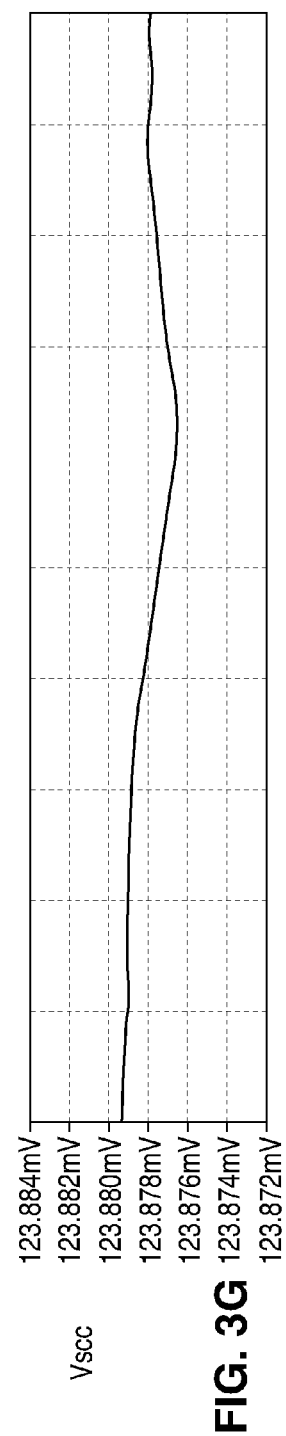
FIG. 3G Vscc
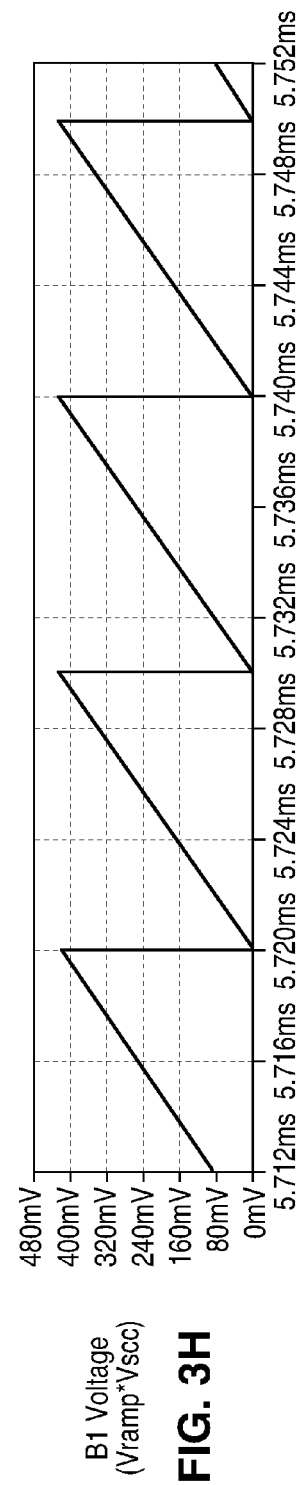
FIG. 3H B1 Voltage (Vramp*Vscc)

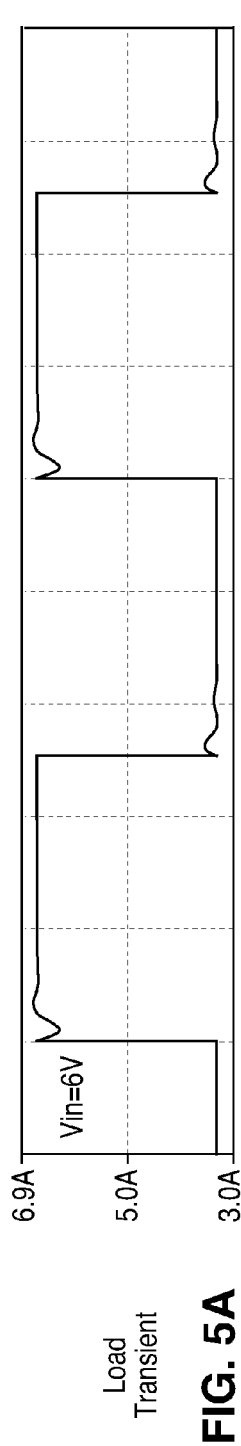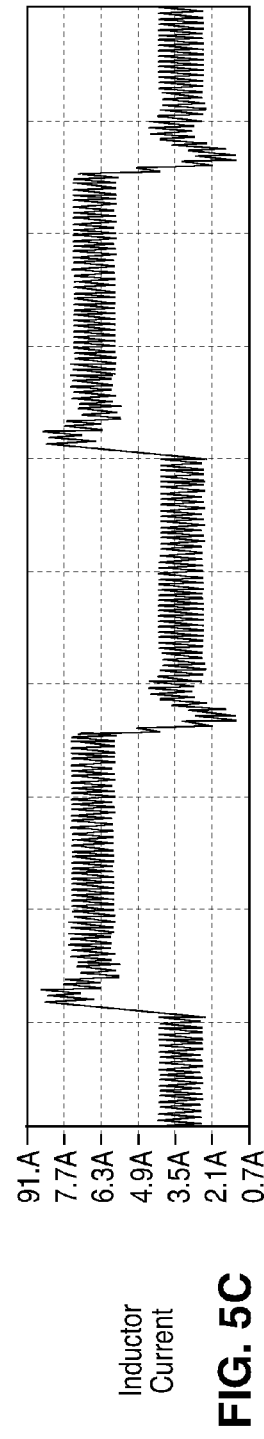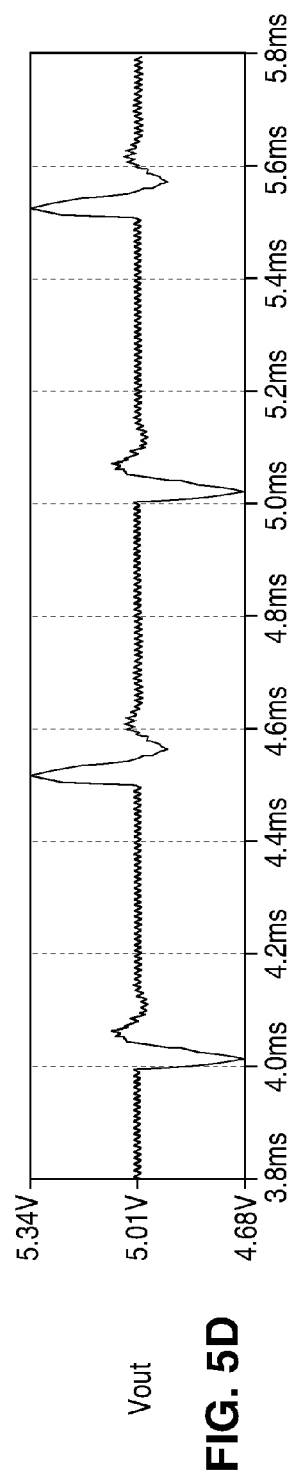
FIG. 5A Load Transient
FIG. 5B Vscc
FIG. 5C Inductor Current
FIG. 5D Vout

ADAPTIVE SLOPE COMPENSATION FOR CURRENT MODE SWITCHING POWER SUPPLY

FIELD OF THE INVENTION

This invention relates to slope compensation circuits for current mode switching power supplies, such as voltage regulators, and in particular to an adaptive slope compensation circuit.

BACKGROUND

A conventional current mode voltage regulator includes a current feedback loop and a voltage feedback loop for controlling the peak instantaneous current through a transistor switch for each switching cycle to regulate the output voltage. The duty cycle of the transistor switch is controlled by the feedback paths to regulate the voltage. It is well known that operating at a duty cycle near or above 50% can result in oscillations of the duty cycle and output voltage in response to perturbations in the load or the input voltage. For example, in response to a perturbation, the duty cycle may continue to oscillate between two values in alternate switching cycles, referred to as a sub-harmonic oscillation.

FIG. 1 shows an example of a current mode voltage regulator without any slope compensation. The solid waveform 6 represents the instantaneous inductor current at a duty cycle of about 70% when the regulator is operating properly. The transistor switch is turned on at the beginning of a switching cycle and turned off when the instantaneous inductor current crosses a current threshold Ith, set by an error amplifier receiving an output voltage feedback signal. If there is a perturbation in the load or input voltage, the duty cycle reacts to the perturbation, which creates the dashed line instantaneous inductor current waveform 8. As seen, the duty cycle then fluctuates and may settle into an oscillation pattern where the duty cycle changes each switching cycle while trying to maintain the proper peak current. This creates significant ripple in the output voltage.

The typical current mode regulator includes a slope compensation circuit that dampens such duty cycle oscillations. In one example, the current threshold (in the voltage feedback path), used for determining when to turn the transistor switch off, is modulated by the same downward ramp signal for each switching cycle to provide slope compensation. Such a technique works but the slope compensation is fixed by the circuit designer, where the designer optimizes the slope compensation for a particular set of likely off-chip components to be selected by the user and for a particular duty cycle. Therefore, even though the duty cycle perturbations may be eventually dampened, the number of switching cycles needed for the damping in actual operation is variable. Additionally, with fixed slope compensation, the load current perturbation may be such that the duty cycle perturbation is never damped or the duty cycle goes into an oscillating pattern. This is a significant problem when a constant output voltage is important. If the slope compensation is higher than necessary, the behavior of the converter may exhibit characteristics of voltage mode control, hence voiding the advantages of current mode control.

In a similar type of slope compensation circuit, the instantaneous current feedback signal, rather than the current threshold, is adjusted by a fixed upward slope compensation. Since the transistor switch shuts off when the rising instantaneous current signal crosses the current threshold, the slope compensation can either modulate the current threshold with a downward ramp or modulate the instantaneous current signal with an upward ramp.

Other types of slope compensation circuits may be adaptive and receive information from the regulator to adjust the slope compensation to be more optimal. However, such circuits tend to be complex and hence use up valuable chip area and power. In some examples, the adaptive slope compensation circuit requires a microprocessor.

What is needed is a compact adaptive slope compensation circuit that uses very little area and power yet adjusts the slope compensation so that perturbations in the duty cycle are damped within only one cycle or only a few cycles.

SUMMARY

In the preferred embodiment, an adaptive slope compensation circuit adjusts the instantaneous current feedback signal of a current mode regulator.

A rising first ramp signal, independent of the instantaneous inductor current, is generated at the start of each switching cycle, where the first ramp signal always has the same slope. This first ramp signal, when used for slope compensation, may adequately damp any duty cycle perturbations, but the number of cycles needed for the damping would be generally unpredictable (like the prior art) since the number of cycles needed for the damping depends on the external components (typically selected by the user for a particular application) and the duty cycle. When a highly stable output voltage is desired, such a relatively slow damping time may not be adequate.

This first ramp signal is then compensated by a compensation circuit to create a compensated ramp signal. The compensation changes as the duty cycle changes and will be different for different external components (e.g., inductors, loads, etc.) selected by the user. As such, the compensation is adaptive.

The compensated ramp signal is then added to the actual instantaneous current feedback signal, to create a compensated current feedback signal, for application to a comparator to determine when to turn off the transistor switch. A threshold level is applied to the other input of the comparator. The up-slope and down-slope of the compensated current feedback signal are detected for each switching cycle. The slope values are processed by simple circuits to generate subsequent compensated ramp signals for subsequent switching cycles.

The compensation circuit forces the compensated current feedback signal (applied to the comparator) to have an up-slope greater than the absolute value of its down-slope for duty cycles near and above 50%. (For duty cycles greater than 50%, the up-slope of the actual (uncompensated) inductor current is lower than the absolute value of its down-slope.) With these characteristics, there will be rapid dampening of any perturbation of any duty cycle due to, for example, a load current change. Such damping can then occur within a single switching cycle after the load current perturbation.

In one embodiment, the circuit uses a differentiator, for generating up and down-slope values, and uses sample and hold circuits for providing the up and down slopes of the instantaneous current signal to downstream circuitry to generate the compensation signal for the first ramp signal. An averaging circuit is used to average the slopes over one or a few switching cycles to smooth out the compensation of the first ramp signal.

In another embodiment, further compensation is added to the instantaneous current feedback signal to compensate for the small ripple in the threshold signal applied to the comparator. The small ripple is due to the ripple of the output voltage of the converter at the switching frequency. Such ripple in the threshold signal may induce instabilities and could further aggravate duty cycle perturbations. With such added compensation, any inaccuracy due to ripple in the threshold signal is compensated for, resulting in faster damping of duty cycle perturbations in the event of disturbances applied to the converter.

The circuitry used for the adaptive slope compensation circuit takes up less area than the prior art adaptive slope compensation circuits and uses less power.

Simulation results are shown.

Various other embodiments are described.

BRIEF DESCRIPTION OF THE DRAWINGS

FIGS. 3A-3H are examples of waveforms generated at various nodes in the circuit of FIG. 2 taken from a computer simulation.

FIG. 4A is similar to FIG. 3A; FIG. 4B is similar to FIG. 3B; FIG. 4C is similar to FIG. 3H; FIG. 4D is similar to FIG. 3C; and FIG. 4E is similar to FIG. 3D (but inverted).

FIGS. 5A-5D are examples of waveforms generated, using computer simulation, at various nodes in the circuit of FIG. 2 in response to the load transient shown in FIG. 5A.

FIG. 7 illustrates another embodiment of a slope compensation circuit where the "uncompensated" ramp signal is only generated while the transistor switch is on.

Elements that are the same or equivalent are labeled with the same numeral.

DETAILED DESCRIPTION

Figure 1:
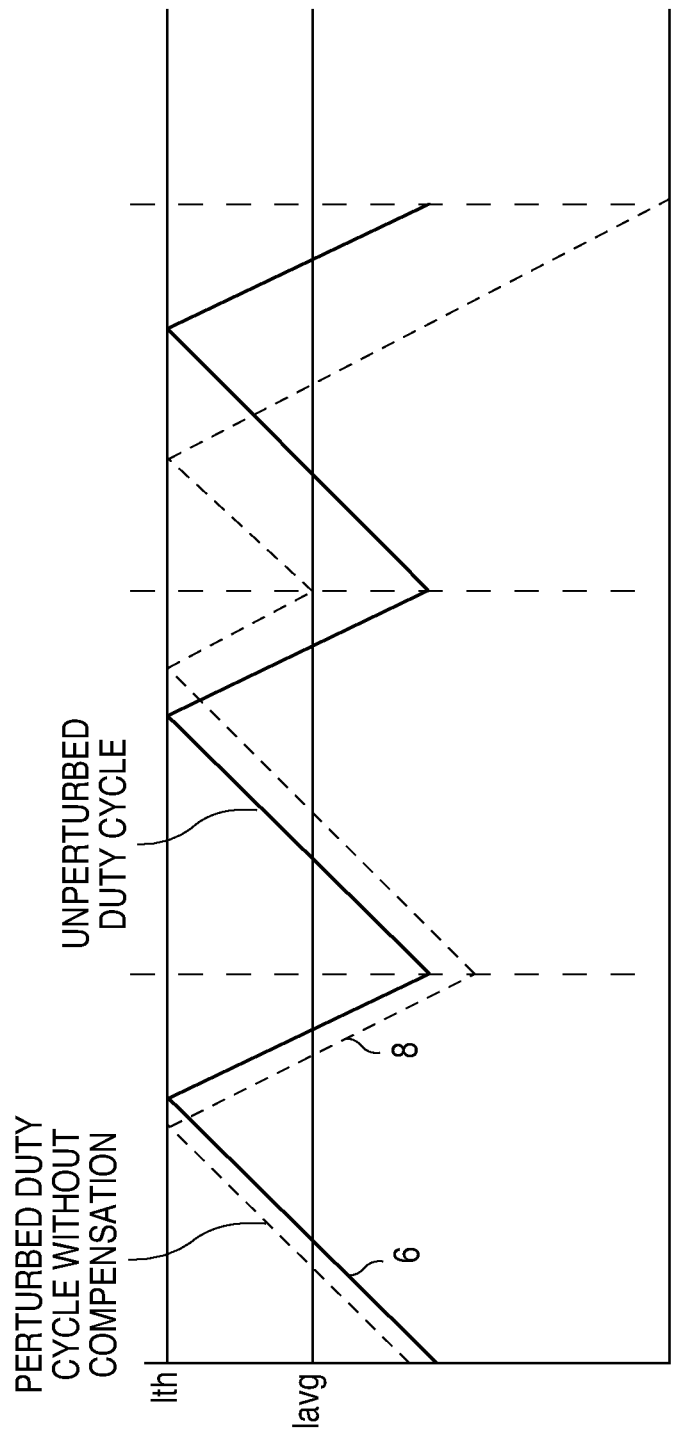
FIG. 1 illustrates an instantaneous inductor current in a current mode voltage regulator without any slope compensation, where an ideal waveform is shown in solid lines and a varying duty cycle waveform is shown in dashed lines due to a perturbation in the load or input voltage.
Figure 2:
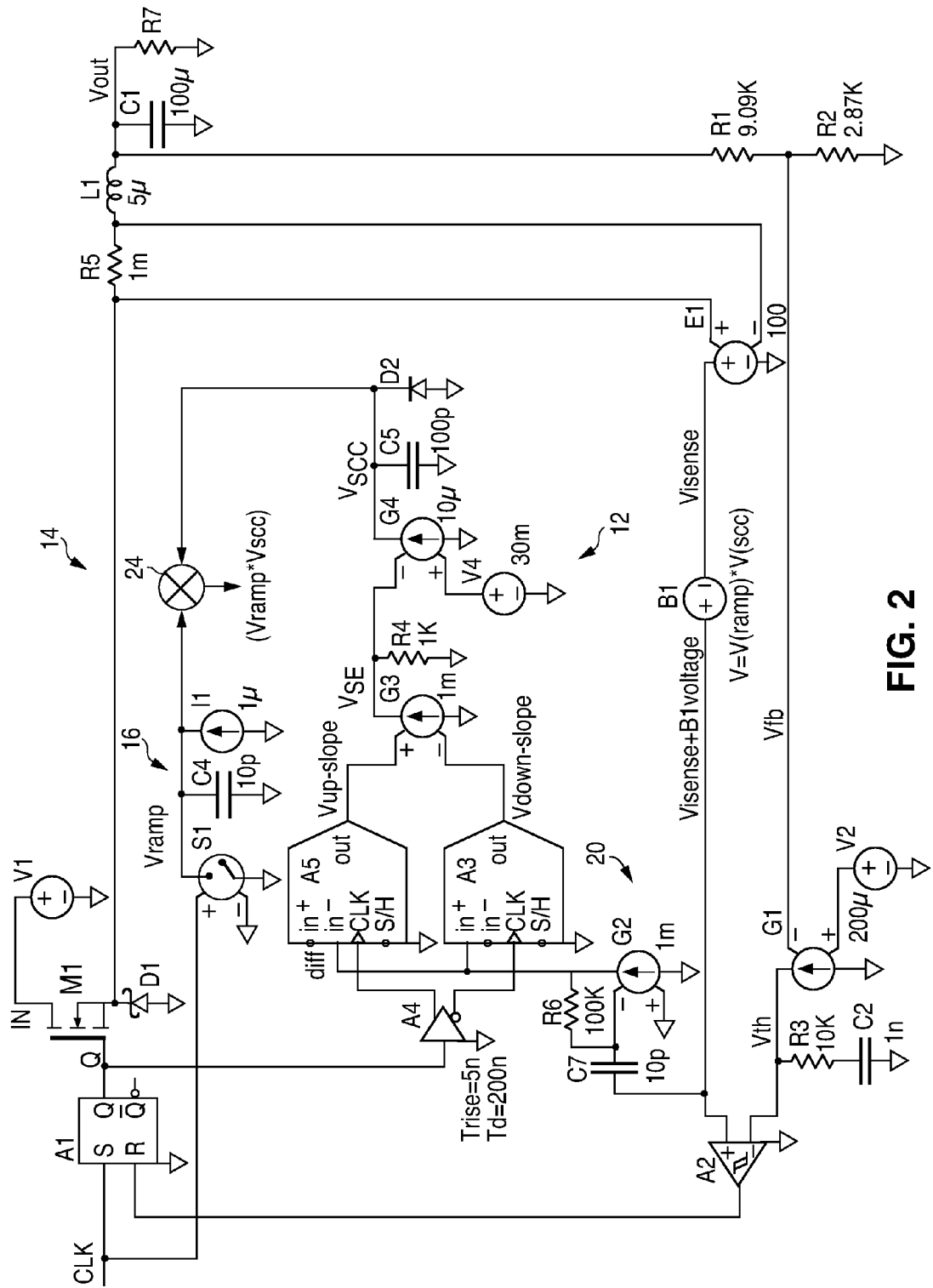
FIG. 2 illustrates one embodiment of the slope compensation circuit of the present invention within a current mode buck converter.

FIG. 2 is an actual simulation circuit diagram representing an embodiment of the slope compensation circuit being used with an otherwise conventional current mode buck voltage regulator. The nomenclature used in the actual simulated circuit will be used to identify the various elements. The slope compensation portion 12 may be used with many other types of current mode switching circuits, including boost, buck-boost, current regulation, etc.

Figure 3A:
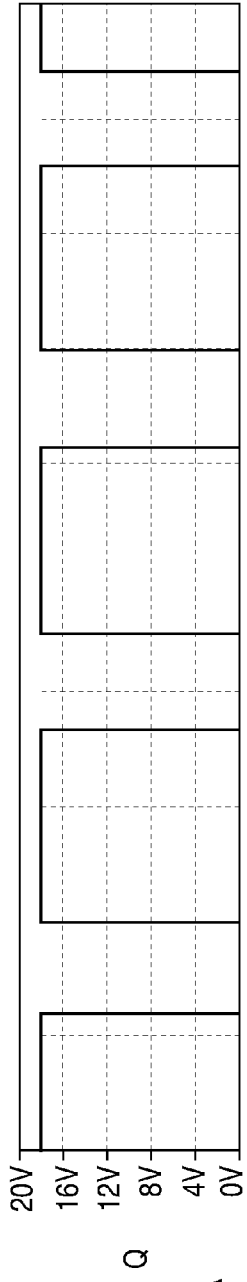
Figure 3B:
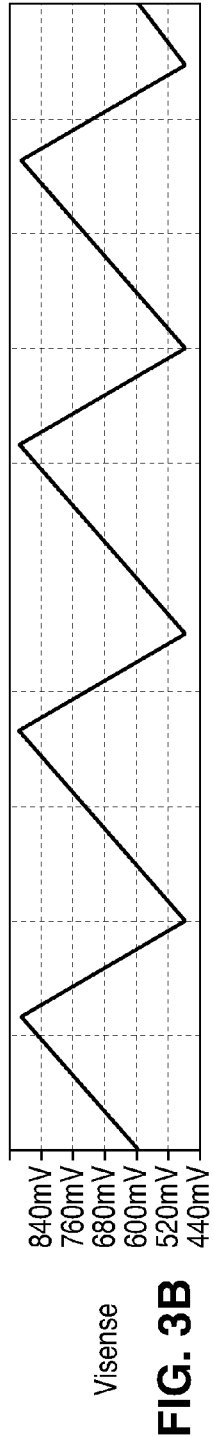

The overall regulator 14 receives an input voltage V1 and outputs a regulated output voltage Vout. When the MOSFET M1 is turned on by the high Q output of the reset/set (RS) flip-flop A1, current flows through the low value sense resistor R5 and inductor L1 to charge the output capacitor C1 for delivering current to the load R7 at the regulated output voltage Vout. The instantaneous ramping current causes a voltage drop across the sense resistor R5, which is sensed by the differential amplifier E1. The current sense voltage (Visense) of the amplifier E1 is thus proportional to the instantaneous inductor current $i_L$. Many other types of conventional current sensors may be used, including a sensor in the MOSFET M1 itself. FIG. 3A illustrates an example of the Q output of the RS flip-flop A1, and FIG. 3B illustrates an example of the current sense voltage Visense output of the differential amplifier E1, corresponding to the instantaneous inductor L1 current. The voltage Visense is then compensated by a controllable voltage source B1, in series with the voltage Visense, whose voltage is determined by the slope compensation circuit 12. The compensated voltage (Visense+B1 voltage) is then applied to an input of a comparator A2. The controllable voltage source B1 may be a voltage source in series between the amplifier E1 and the comparator A2 or may be an adder that adds the voltage Visense to the B1 voltage. In either case, the B1 voltage is summed with the voltage Visense.

The regulator's output voltage Vout is divided by a resistor divider (resistors R1 and R2) to provide a feedback voltage Vfb that is equal to a reference voltage V2 when the desired level of the output voltage Vout is obtained. The regulator tries to keep Vfb equal to V2 by adjusting a threshold voltage Vth, and hence the duty cycle of the MOSFET M1.

The feedback voltage Vfb and the reference voltage V2 are applied to inputs of a transconductance error amplifier G1. A resistor/capacitor circuit (resistor R3 and capacitor C2) converts the current output of the error amplifier G1 to a threshold voltage Vth that is applied to the comparator A2. When Vfb equals V2, the output of the error amplifier G1 is zero current, so the threshold voltage Vth stays the same and the duty cycle does not change.

When the compensated voltage (Visense+B1 voltage) is rising and crosses the threshold voltage Vth, the comparator A2 is tripped and outputs a short pulse, which resets the RS flip-flop A1 and turns off the MOSFET M1 for the remainder of the switching cycle.

When the MOSFET M1 is off, the diode D1 become forward biased, and the ramping down inductor L1 current flows through the diode D1 and to the output capacitor C1 and load R7.

The clock signal CLK (a short pulse) then sets the RS flip-flop A1 at the beginning of the next cycle, and the process repeats. The CLK frequency may be, for example, 100 kHz.

The slope compensation circuit 12 will now be described. The slope compensation circuit 12, along with other circuitry, generates the voltage generated by the voltage source B1 for summing with the voltage Visense to create the compensated current sense voltage (Visense+B1 voltage).

A ramp generator 16 is triggered by a high CLK pulse (which also sets the RS flip-flop A1), which generates an up-ramping voltage Vramp at the same time that the instantaneous current through the inductor L1 is ramping up. The slope of the output of the ramp generator 16 is determined by the components used to create the ramp generator 16. The high CLK pulse (e.g., 10 ns) briefly closes a switch S1 to discharge the capacitor C4 voltage to zero, followed by a current source I1 charging the capacitor C4 to create a ramping voltage (Vramp). Vramp will be modulated by a compensation signal, as discussed below, to create the B1 voltage.

An input of a differentiator circuit 20 is coupled to the compensated current sense voltage (Visense+B1 voltage) for differentiating the compensated current sense voltage (Visense+B1 voltage). The differentiator circuit 20 comprises a capacitor C7, a differential amplifier G2, and a feedback resistor R6. The output of the differentiator circuit 20 is a signal proportional to the slope of the compensated current sense voltage (Visense+B1 voltage). The compensated current sense voltage (Visense+B1 voltage) ramps up with a slope $m_1$ (FIG. 4B) when the MOSFET M1 is on and ramps down with a slope $m_2$ (FIG. 4B) when the MOSFET M1 is off.

The output of the differentiator circuit 20 is applied to the inverting input of a first sample and hold circuit A5 and applied to the non-inverting input of a second sample and hold circuit A3. The first sample and hold circuit A5 is clocked by the Q output of the RS flip-flop A1, and the second sample and hold circuit A3 is oppositely clocked by the inverted Q output of the RS flip-flop A1. A driver A4 provides the clock signals to the sample and hold circuits A3 and A5. In the preferred embodiment, a slight delay in the clocking (e.g., 200 nsec) is used to avoid any sampling of switching noise. Thus, the sample and hold circuit A5 outputs a voltage Vup-slope corresponding to the up slope of the compensated current sense voltage (Visense+B1 voltage), and the sample and hold circuit A3 outputs a voltage Vdown-slope corresponding to the down slope of the compensated current sense voltage (Visense+B1 voltage). The polarity of Vup-slope is reversed since the up slope signal is inverted by the sample and hold circuit A5.

Figure 3C:
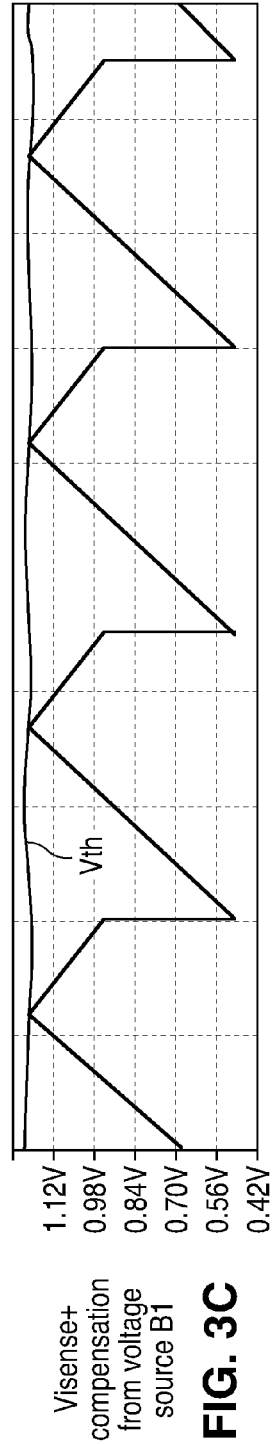
Figure 3D:
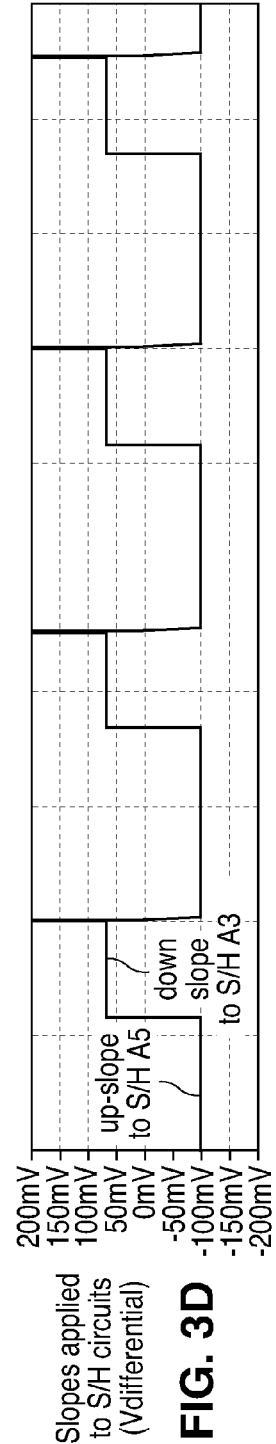

FIG. 3D illustrates the up and down slope values applied to the sample and hold circuits A5 and A3 respectively. FIG. 3E illustrates the alternate clocking of the sample and hold circuits A5 and A3. FIG. 3F illustrates the absolute value held Vup-slope and Vdown-slope signals that are output by the sample and hold circuits A5 and A3.

The voltage Vdown-slope is then subtracted from the voltage Vup-slope (both have the same polarity) by a subtractor G3, which outputs a current proportional to the difference between the absolute values of the up slope and down slope of the compensated current sense voltage (Visense+B1 voltage). The current is converted to a voltage by the voltage drop across the resistor R4 to generate the slope error voltage Vse.

FIG. 3F illustrates the voltage Vse resulting from the subtraction of the Vdown-slope from the Vup-slope.

The voltage Vse is applied to a transconductance amplifier G4. A constant DC offset voltage generated by a voltage source V4 is applied to another input of the amplifier G4 for subtracting the voltage Vse from the offset voltage and amplifying the difference. In one embodiment, the offset voltage is 30 mV. In steady state operation, the output of the amplifier G4 is zero. The output of the amplifier G4 may be a positive or negative current depending on whether the voltage Vse is greater or less than the offset voltage.

The output of the amplifier G4 is a current corresponding somewhat to the difference between the up slope and down slope of the compensated current sense voltage (Visense+B1 voltage). This current charges a capacitor C5 to a certain slope compensation-compensation voltage Vscc. The small capacitor C5 (e.g., 100 pF) serves to average the voltage Vscc over one or a few cycles. An example of the voltage Vscc waveform is shown in FIG. 3G. The adaptive value of Vscc ensures that the up-slope of the compensated current sense voltage (Visense+B1 voltage) will always be greater than the absolute value of the down-slope of the compensated current sense voltage (Visense+B1 voltage). This ensures rapid damping of any duty cycle perturbations.

The diode D2 ensures the value of Vscc does not go negative.

The offset voltage (e.g., 30 mV), by the voltage source V4, causes the up-slope of the compensated current sense voltage (Visense+B1 voltage) to be greater than the absolute value of its down-slope by the corresponding offset voltage amount. For example, if the up-slope corresponded to 100 mV, the down-slope would correspond to 70 mV. The voltages are proportional to the slope. A lower offset voltage would still work, but the perturbations in the duty cycle would take longer to settle.

For duty cycles below a certain value (somewhat below 50%), the voltage Vse will be sufficiently positive that the output of the amplifier G4 will be negative, and there will be no compensation of the voltage Visense. This is because there is inherently good damping of duty cycle perturbations for duty cycles below 50%.

The voltage Vramp (generated by the ramp generator 16) is multiplied by the voltage Vscc using a multiplier 24 to generate the B1 voltage (Vramp*Vscc). The B1 voltage is then added to the current sense voltage Visense, as previously described, to compensate the voltage Visense.

FIG. 3H shows the B1 voltage (Vramp*Vscc). FIG. 3C shows the compensated current sense voltage (Visense+B1 voltage) applied to the comparator A2, which is compared to the threshold voltage Vth.

Under these conditions, the slope compensation completely corrects for duty cycle perturbations on the next switching cycle or within just a few switching cycles. The slope compensation increases with the duty cycle near or above 50%, since the voltage Vscc becomes greater and greater (up to a limited value) as the up-slope of the voltage Visense becomes less than the absolute value of the down-slope of the current sense voltage Visense. As a result, there is no overcompensation at duty cycles near or above 50%, in contrast to prior art fixed slope compensation ramps.

Simulations have shown the circuit of FIG. 2 to damp duty cycle oscillations down to one cycle.

Many other techniques may be used to implement the present invention.

Figure 4A:
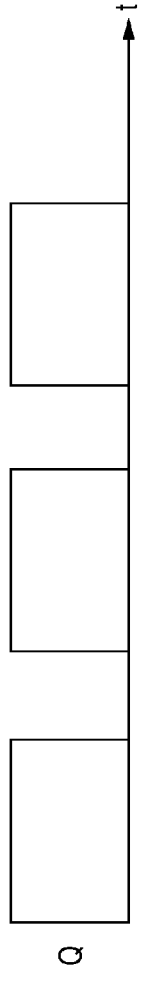
FIGS. 4A-4E illustrate simplified waveforms with annotations to help understand the functional circuit of FIG. 4F, where
Figure 4B:
Figure 4C:
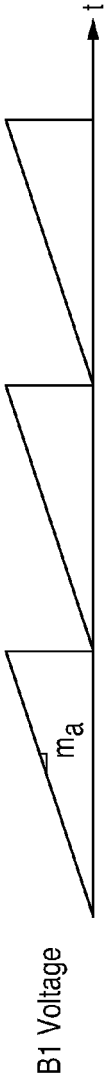
Figure 4D:
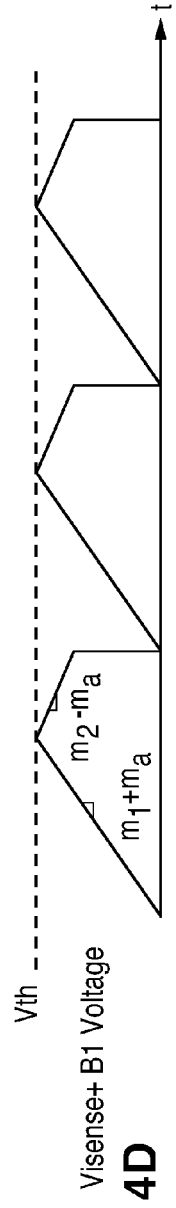
Figure 4E:
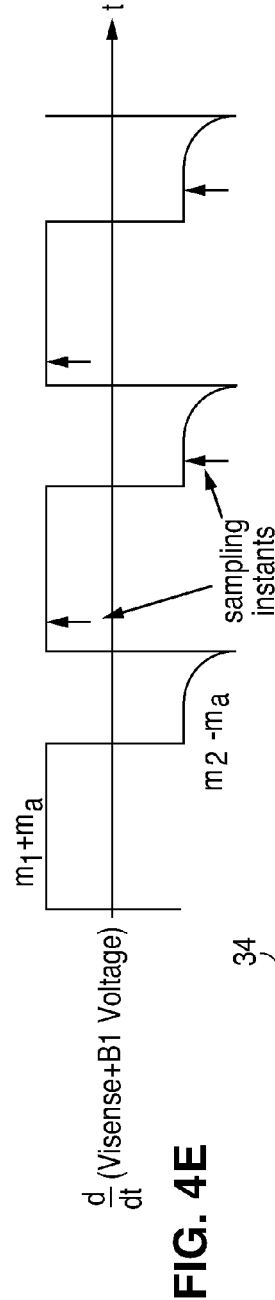
Figure 4F:
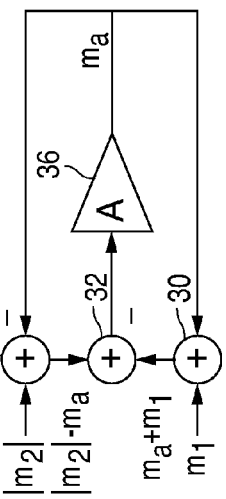
FIG. 4F illustrates a simplified circuit functionally showing the processing of the slope values identified in FIG. 4D to obtain the proper relationship between the up-slope and down-slope of the compensated inductor current signal.

FIGS. 4A-4E are simplified waveforms with annotations used for better explaining the functional circuit of FIG. 4F.

FIG. 4A illustrates a Q signal waveform output from the RS flip-flop A1 of FIG. 2. This particular pattern of the Q signals results in a ramping instantaneous inductor current corresponding to the voltage Visense output (FIG. 4B) from the amplifier E1. The up-slope has a sampled slope of $m_1$ (which can be considered as a voltage corresponding to the absolute value of the slope), and the down-slope has a sampled slope of $m_2$. At duty cycles greater than 50%, the up-slope $m_1$ is less than the down-slope $m_2$.

Based on the held slopes and the processing performed in FIG. 2, the voltage generated by the voltage source B1 is shown in FIG. 4C, with the up-slope having a slope of $m_a$.

FIG. 4D illustrates the sum of the voltage Visense and the output of the voltage source B1 (where the sum is applied to the comparator A2) and shows that the up-slope has a slope of $m_1+m_a$, and the down-slope has a slope of $m_2-m_a$. FIG. 4D also shows the voltage Vth applied to another input of the comparator A2. The slope compensation circuit 12 forces the up-slope of the combined voltages to always be greater than the down-slope for at least duty cycles near or above 50% to ensure any duty cycle perturbations are damped quickly. Below a 50% duty cycle of the MOSFET M1, the up-slope of the actual inductor current is naturally greater than the down-slope, so compensation is not needed.

FIG. 4E shows the corresponding slopes of the waveform of FIG. 4D after the differentiation and sample/hold of the differentiated signal. Note that the feedback forces $(m_1+m_a)$ to be always be greater than $(|m_2|-m_a)$.

The functional performance of the slope compensation circuit of FIG. 2 is shown in FIG. 4F, where the adder 30, subtractors 32 and 34, amplifier 36, and the negative feedback connections cause the following to be true: $(m_1+m_a) > (|m_2|-m_a)$. This ensures that the duty cycle will be damped within one or a few cycles of a perturbation.

FIGS. 5A-5D show waveforms from a simulation of the circuit of FIG. 2 in response to a load perturbation.

FIG. 5A shows a large load current transient between 6.9 A and about 3.3 A, where the MOSFET M1 of FIG. 2 is switching at a duty cycle greater than 50%. Such a perturbation would normally cause a perturbation of the duty cycle.

FIG. 5B shows the resulting fluctuation of the voltage Vscc.

FIG. 5C shows the fluctuation in the inductor current in response to the load current perturbation.

FIG. 5D shows the rapid recovery of the output voltage Vout, where the duty cycle perturbation has been damped out at about the same time as the load current stabilized.

Figure 6:
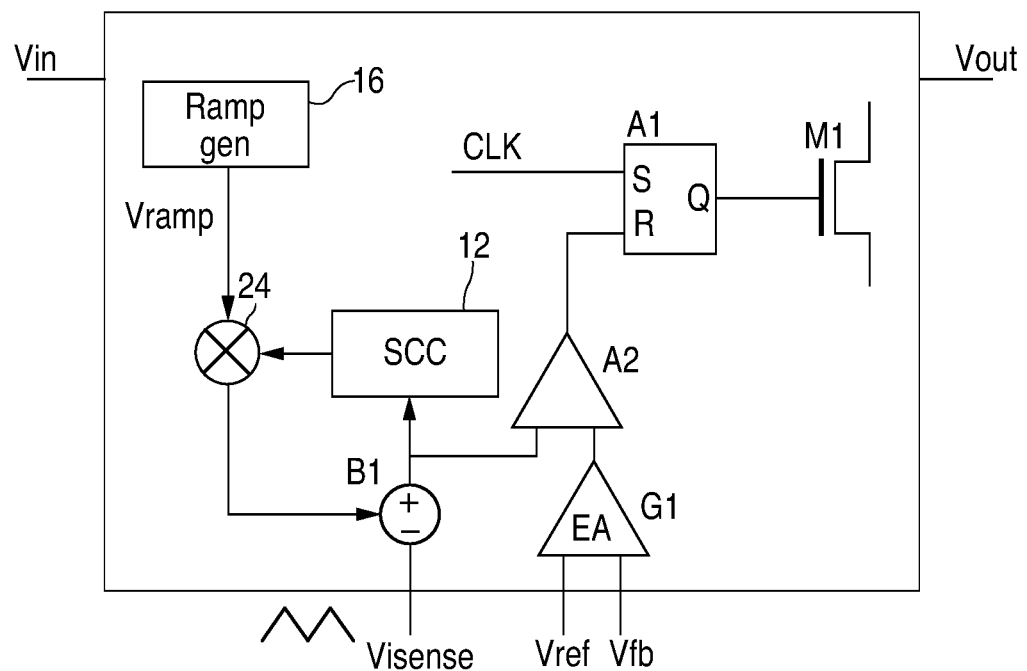
FIG. 6 illustrates a more general depiction of the slope compensation circuit applied to any type of current mode switching power supply, such as a boost or buck voltage regulator.

The slope compensation portion of the converter of FIG. 2 can be used in many other types of converters. FIG. 6 illustrates the slope compensation circuit 12 (generating Vscc) and the ramp generator 16 (generating Vramp) connected to a multiplier 24, whose output controls the voltage source B1 to generate the value Vramp*Vscc. This value is added to the Visense signal and applied to an input of the comparator A2. The error amplifier G1 receives the feedback voltage Vfb and the reference voltage Vref (voltage V2 in FIG. 2), and the resulting signal is applied to the other input of the comparator A2. The output of the comparator A2 resets the RS flip-flop A1 for regulating the peak current of the MOSFET M1 or any other type of transistor switch. The duty cycle of the MOSFET M1 is controlled to achieve a regulated output signal, which in the example is a regulated output voltage V1. An output current can instead be regulated by feeding back an output current signal.

Figure 7:
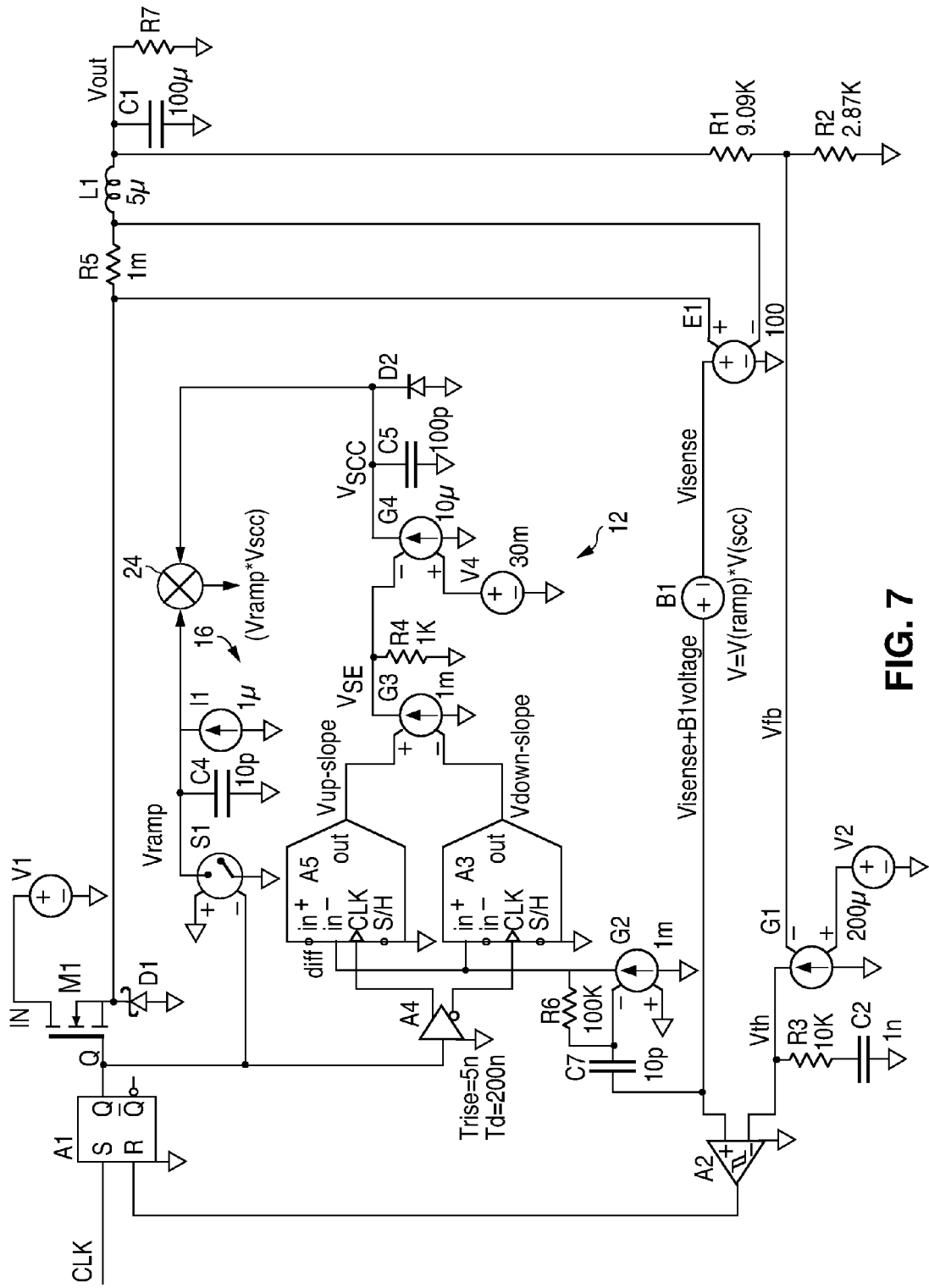

FIG. 7 illustrates an alternative embodiment of the circuit of FIG. 2 where the ramp generator 16 is triggered by the Q output of the RS flip-flop A1 rather than the CLK signal. This results in a voltage Vramp that ramps up when the MOSFET M1 is on and is zero when the MOSFET M1 is off. This difference changes the voltage source B1 voltage to a value of (0.2*Vramp*max of (0.5V or Vscc)). The fractional value of 0.2 is determined based on the particular circuitry used and can be determined by computer simulation.

In another embodiment, the voltage threshold signal from the error amplifier G1 is compensated by using a slope compensation signal that is opposite to the slope compensation signal of FIG. 4C. Such compensation is generated in basically the same way as described with respect to FIG. 2.

The feedback circuit for calculating slope compensation could additionally make use of the voltage ripple on the threshold voltage Vth, applied to the comparator A2, to further improve the compensation. The threshold voltage Vth has some small ripple since the output voltage Vout has ripple at the switching frequency. The example waveform of FIG. 4D assumed that the threshold voltage Vth was constant, which may not be the case.

Figure 8A:
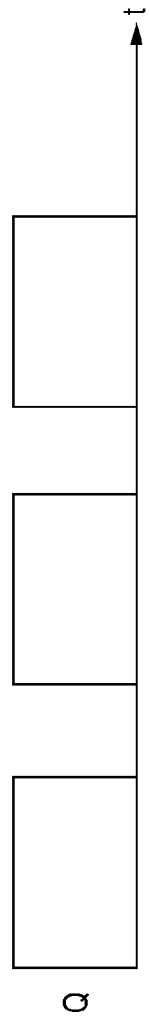
FIGS. 8A-8D are similar to FIGS. 4A-4D but are presented to show how the threshold voltage has a ripple, due to the output voltage having a ripple. The waveforms are annotated to help understand the functional circuit of FIG. 8E.
Figure 8B:
Figure 8C:
Figure 8D:
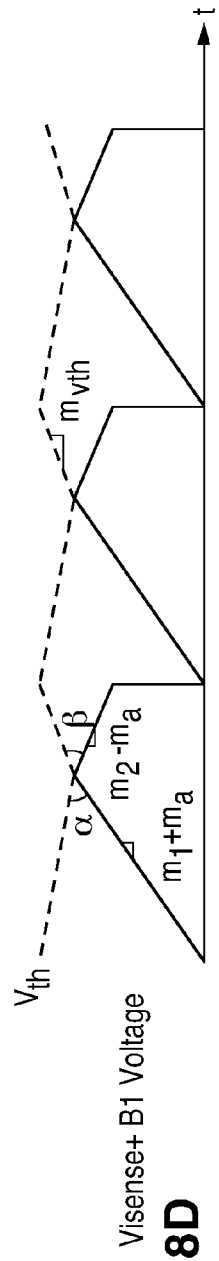

FIGS. 8A-8D illustrate waveforms where the threshold voltage Vth has ripple. FIGS. 8A-8C are identical to FIGS. 4A-4C. FIG. 8D shows the ripple of the threshold voltage Vth greatly exaggerated. The actual ripple would also be smoother. The waveforms are annotated, where the up-slope of Visense is $m_1$ (a voltage corresponding to the absolute value of the slope), the down-slope of Visense is $m_2$, the up-slope of the B1 voltage is $m_a$, and the up-slope of Vth is $m_{vth}$. The angle between Vth and the up-slope of the compensated current sense voltage (Visense+B1 voltage) is $\alpha$, and the angle between Vth and the down-slope of the compensated current sense voltage (Visense+B1 voltage) is $\beta$.

Figure 8E:
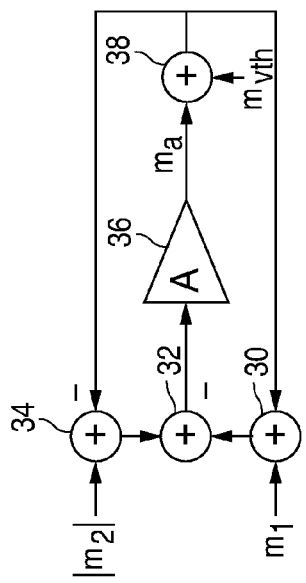
FIG. 8E illustrates a simplified circuit functionally showing the processing of the slope values identified in FIG. 8D to obtain the proper relationship between the up-slope and down-slope of the compensated inductor current sense voltage while taking into account the ripple in the threshold voltage.

The functional performance of the slope compensation circuit that performs the function of the circuit of FIG. 2, as well as takes into account the threshold voltage ripple, is shown in FIG. 8E, where the adder 30, subtractors 32, 34, 38, amplifier 36, and the negative feedback connections cause the following to be true. Stability criteria for current mode control is $\alpha > \beta$, which translates to $(m_1+m_a) > (|m_2|-m_a)$ if Vth is at a DC level. As the equivalent series resistance (ESR) of the output capacitor C1 is increased, or the capacitance is reduced, Vth exhibits a greater voltage ripple. Hence, additional compensation by the B1 voltage (greater up-slope $m_a$) is needed. The circuit of FIG. 8E subtracts the $m_{vth}$ up-slope from the output of the amplifier 36, which forces the feedback loop to increase $m_a$. This further ensures that the duty cycle will be damped within one or a few cycles of a perturbation irrespective of the ripple in the threshold voltage Vth.

Figure 9:
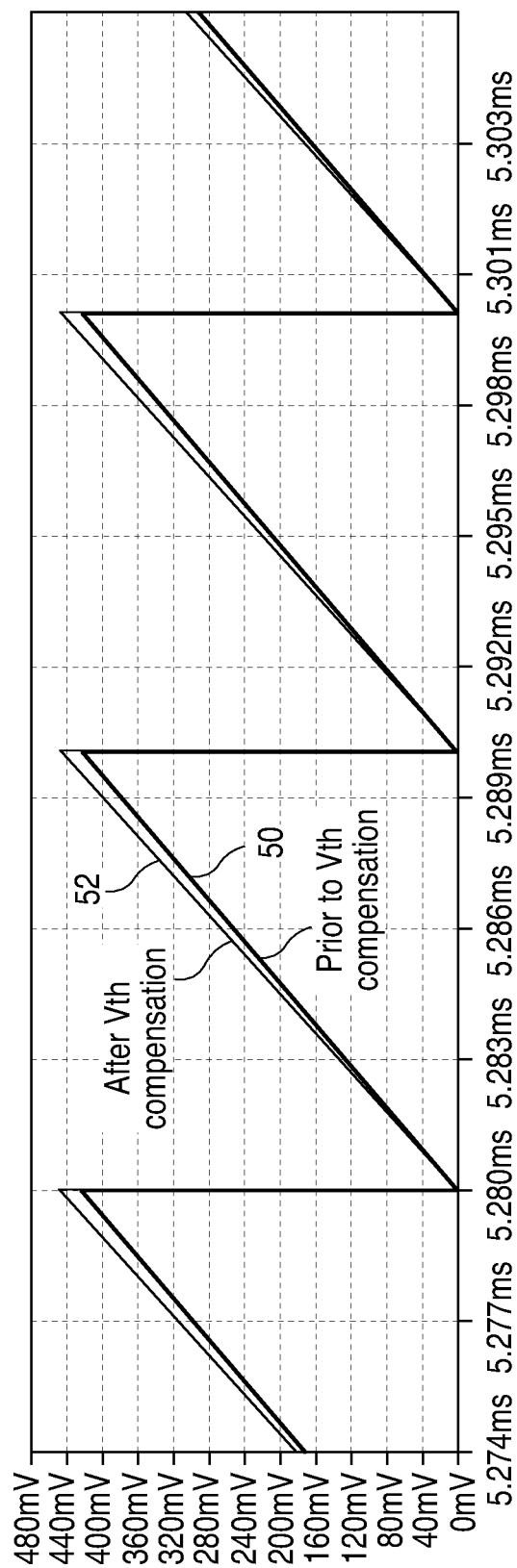
FIG. 9 illustrates the compensation waveform added to the inductor current sense voltage, where one waveform does not take into account the ripple in the threshold voltage and the other waveform takes into account the ripple in the threshold voltage.
Figure 10:
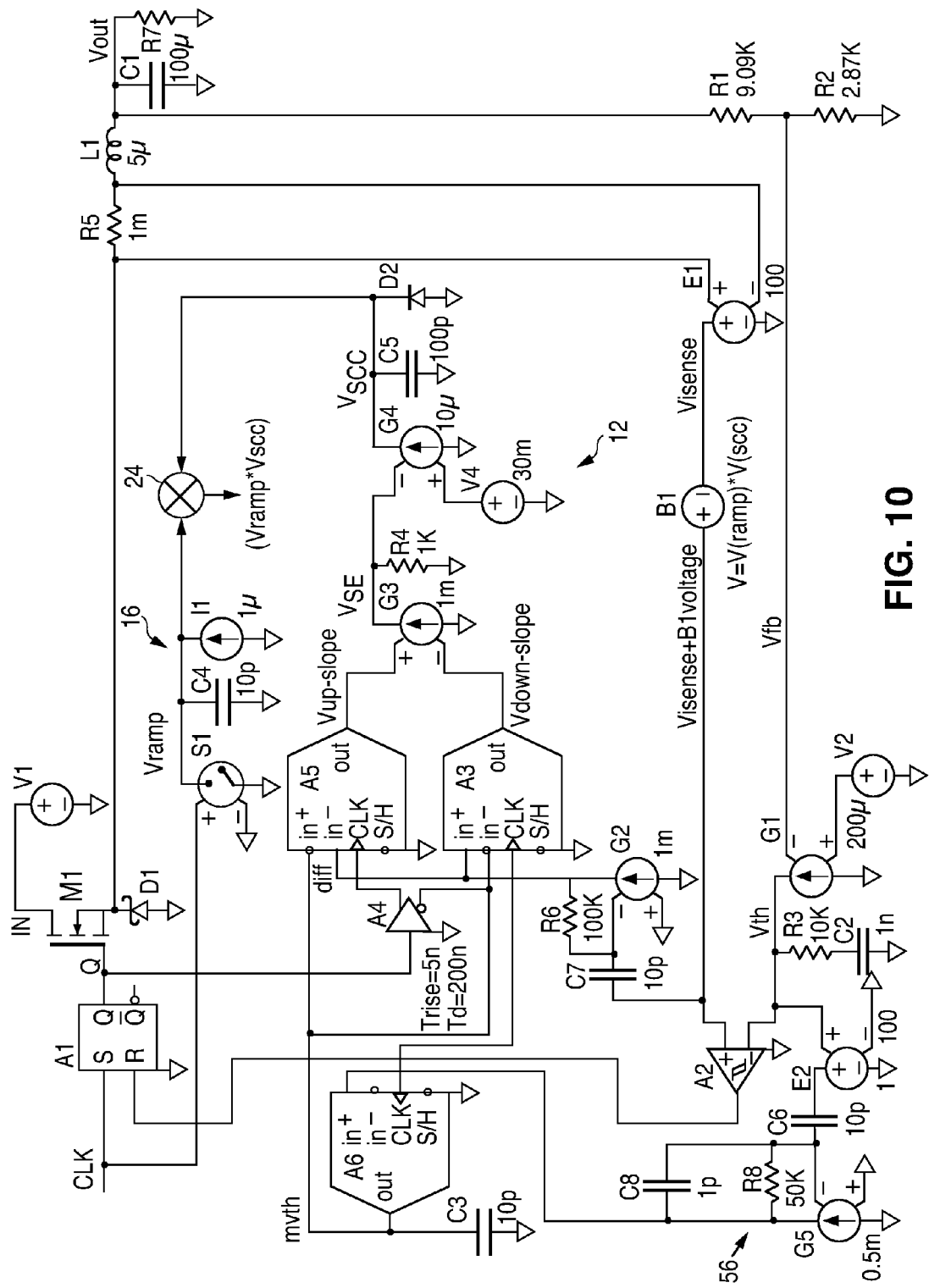
FIG. 10 illustrates a converter circuit that is the same as that shown in FIG. 2 except a threshold voltage ripple compensation circuit has been added.

FIG. 9 illustrates waveforms obtained by computer simulation showing the B1 voltage (for compensating the voltage Visense) generated by the circuit of FIG. 2 (waveform 50) compared with the B1 voltage generated by the circuit of FIG. 10 (waveform 52) which additionally uses the Vth voltage ripple in determining the B1 voltage. Note that the waveform 52 provides more compensation to Visense due to the Vth ripple.

FIG. 10 shows the circuit of FIG. 2 augmented with a circuit that uses the threshold voltage Vth ripple to augment the B1 voltage. The circuit of FIG. 10 includes an additional differentiator circuit 56 and sample and hold circuit A6 to generate the slope $m_{vth}$ (a voltage corresponding to the threshold voltage slope). The slope is then applied to the non-inverting input of the sample and hold circuit A5 as well as to the inverting input of the sample and hold circuit A3.

This effectively will reduce the voltage Vse and increase the voltage Vscc to increase the amount of compensation. The differentiator 56 is conventional and is formed of the differential amplifier E2, capacitors C6 and C5, resistor R8, and subtractor G5.

Many other circuit configurations may be used to carry out the inventive technique.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A current mode switching converter comprising:
a transistor switch;
an inductor configured to conduct a ramping inductor current as the transistor switch is turned on and off at a particular duty cycle;
a current sensor configured to convert the ramping inductor current to a corresponding current sense signal, the current sense signal having an up-slope portion with a first slope and having a down-slope portion with a second slope, wherein, at duty cycles greater than 50%, the first slope is less than an absolute value of the second slope;
a ramp generator configured to generate a ramp voltage while the current sense signal has the first slope;
an adaptive slope compensation circuit configured to generate a compensation voltage for the ramp voltage to create a compensated ramp voltage;
a combining circuit configured to sum the compensated ramp voltage with the current sense signal to create a compensated current sense signal;
a threshold voltage generator configured to generate a threshold voltage for determining a peak current through the inductor; and
a comparator configured to receive the compensated current sense signal and the threshold voltage for determining when to turn off the transistor switch,
wherein the adaptive slope compensation circuit forces the compensated current sense signal to have an up-slope greater than an absolute value of its down-slope at least for duty cycles greater than 50%.

2. The converter of claim 1 wherein the adaptive slope compensation circuit comprises:
a first differentiator circuit configured to convert the compensated current sense signal to a first up-slope voltage and a first down-slope voltage;
a first sample and hold circuit configured to sample and hold the first up-slope voltage;
a second sample and hold circuit configured to sample and hold the first down-slope voltage; and
a processing circuit coupled to output terminals of the first sample and hold circuit and the second sample and hold circuit, the processing circuit configured to process the first up-slope voltage and the first down-slope voltage to derive a first compensation signal that compensates the ramp voltage to generate the compensated ramp voltage.

3. The converter of claim 2 wherein the processing circuit comprises:
a first subtractor having inputs coupled to the output terminals of the first sample and hold circuit and the second sample and hold circuit, the first subtractor configured to generate a first current across a first resistance to generate a first voltage; and
a transconductance amplifier having inputs coupled to receive the first voltage and an offset voltage, the amplifier being configured to generate a second current for charging and discharging a first capacitor to generate the compensation voltage at the first capacitor to compensate the ramp voltage to create the compensated ramp voltage.

4. The converter of claim 2 wherein the threshold voltage has ripple, the converter further comprising:
a second differentiator circuit configured to convert the threshold voltage to a second up-slope voltage and a second down-slope voltage; and
a third sample and hold circuit configured to sample and hold the second up-slope voltage, wherein an output of the third sample and hold circuit is further used to derive the compensation voltage for the ramp voltage to create the compensated ramp voltage.

5. The converter of claim 4 wherein the output of the third sample and hold circuit is coupled to an input of the first sample and hold circuit for combining with the first up-slope voltage corresponding to an up-slope of the compensated current sense signal.

6. The converter of claim 2 further comprising:
a reset/set flip-flop having a set input terminal coupled to receive a clock pulse and having an output terminal configured to generate an on-signal for the transistor switch when the reset/set flip-flop is set by the clock pulse,
wherein the first sample and hold circuit is clocked by the clock pulse.

7. The converter of claim 6 wherein the first sample and hold circuit is clocked by a non-inverted clock pulse, and the second sample and hold circuit is clocked by an inverted clock pulse.

8. The converter of claim 2 further comprising:
a reset/set flip-flop having a set input terminal coupled to receive a clock pulse and having an output terminal configured to generate an on-signal for the transistor switch when the reset/set flip-flop is set by the clock pulse,
wherein the first sample and hold circuit has a clock terminal coupled to the output terminal of the reset/set flip-flop so as to be clocked with the on-signal.

9. The converter of claim 8 wherein the first sample and hold circuit is clocked by a non-inverted on-signal, and the second sample and hold circuit is clocked by an inverted on-signal.

10. The converter of claim 1 wherein the adaptive slope compensation circuit is configured so that the compensation voltage increases as the duty cycle exceeds 50%.

11. The converter of claim 1 further comprising a multiplier coupled to the compensation voltage and the ramp voltage to generate the compensated ramp voltage.

12. The converter of claim 1 wherein the converter comprises a current mode buck converter.

13. The converter of claim 1 wherein the adaptive slope compensation circuit is configured to damp duty cycles perturbations in response to a load current perturbation within one switching cycle after the load current perturbation has ceased.

14. The converter of claim 1 wherein the adaptive slope compensation circuit is configured to damp duty cycles perturbations in response to a load current perturbation within two switching cycles after the load current perturbation has ceased.

15. The converter of claim 1 wherein the adaptive slope compensation circuit is configured to damp duty cycles perturbations in response to a load current perturbation within three switching cycles after the load current perturbation has ceased.

16. A method performed by a current mode switching converter comprising:

controlling a transistor switch at a duty cycle;

conducting a ramping inductor current, through an inductor, as the transistor switch is turned on and off at the duty cycle;

converting the ramping inductor current to a corresponding current sense signal, by a current sensor, the current sense signal having an up-slope portion with a first slope and having a down-slope portion with a second slope, wherein, at duty cycles greater than 50%, the first slope is less than an absolute value of the second slope;

generating a ramp voltage, by a ramp generator, while the current sense signal has the first slope;

generating a compensation voltage for the ramp voltage, by an adaptive slope compensation circuit, to create a compensated ramp voltage;

combining the compensated ramp voltage with the current sense signal to create a compensated current sense signal;

generating a threshold voltage for determining a peak current through the inductor; and comparing the compensated current sense signal to the threshold voltage for determining when to turn off the transistor switch, wherein the adaptive slope compensation circuit forces the compensated current sense signal to have an up-slope greater than an absolute value of its down-slope at least for duty cycles greater than 50%.

17. The method of claim 16 wherein generating the compensation voltage for the ramp voltage by the adaptive slope compensation circuit comprises:

differentiating the compensated current sense signal, by a first differentiator circuit, to convert the compensated current sense signal to a first up-slope voltage and a first down-slope voltage;

sampling and holding the first up-slope voltage by a first sample and hold circuit;

sampling and holding the first down-slope voltage by a second sample and hold circuit; and processing the first up-slope voltage and the first down-slope voltage to derive a first compensation signal that compensates the ramp voltage to generate the compensated ramp voltage.

18. The method of claim 17 wherein the processing comprises:

subtracting outputs of the first sample and hold circuit and the second sample and hold circuit, by a the first subtractor, to generate a first current across a first resistance to generate a first voltage; and subtracting the first voltage from an offset voltage and amplifying the difference, by a transconductance amplifier, to generate a second current for charging and discharging a first capacitor to generate the compensation voltage at the first capacitor to compensate the ramp voltage to create the compensated ramp voltage.

19. The method of claim 17 wherein the threshold voltage has ripple, the method further comprising:

converting the threshold voltage to a second up-slope voltage and a second down-slope voltage, by a second differentiator circuit; and sampling and holding the second up-slope voltage, by a third sample and hold circuit, wherein an output of the third sample and hold circuit is further used to derive the compensation voltage for the ramp voltage to create the compensated ramp voltage.

20. The method of claim 19 wherein the output of the third sample and hold circuit is coupled to an input of the first sample and hold circuit for combining with the first up-slope voltage corresponding to an up-slope of the compensated current sense signal.

* * * * *